(12) United States Patent
Fang et al.

(10) Patent No.: US 11,921,983 B2
(45) Date of Patent: *Mar. 5, 2024

(54) METHOD AND APPARATUS FOR VISUALIZATION OF PUBLIC WELFARE ACTIVITIES

(71) Applicant: ADVANCED NEW TECHNOLOGIES CO., LTD., Grand Cayman (KY)

(72) Inventors: Fang Fang, Hangzhou (CN); Han Li, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,455

(22) Filed: Dec. 16, 2022

(65) Prior Publication Data

US 2023/0120293 A1     Apr. 20, 2023

Related U.S. Application Data

(63) Continuation of application No. 16/875,850, filed on May 15, 2020, now Pat. No. 11,561,675, which is a
(Continued)

(30) Foreign Application Priority Data

Jan. 9, 2018    (CN) ........................ 201810019829.4

(51) Int. Cl.
*G06F 3/0482*     (2013.01)
*G06Q 50/22*     (2018.01)
*G09B 29/10*     (2006.01)

(52) U.S. Cl.
CPC ........... *G06F 3/0482* (2013.01); *G06Q 50/22* (2013.01); *G09B 29/102* (2013.01)

(58) Field of Classification Search
CPC ...... G06F 3/0482; G06F 16/29; G06F 16/958; G06Q 50/22; G06Q 50/26; G09B 29/102
See application file for complete search history.

(56) References Cited

U.S. PATENT DOCUMENTS 8,605,094 B1   12/2013   Alfaro et al.
8,756,501 B1 *   6/2014   Karam ................... G06F 3/048
                                                               715/764

(Continued)

FOREIGN PATENT DOCUMENTS

CN         102714524 A     10/2012
CN         103162706 A     6/2013
(Continued)

OTHER PUBLICATIONS

Gillespie et al. (Assessment and Prediction of Natural Hazards from Satellite Imagery, published 2007, pp. 1-17) (Year: 2007).*
(Continued)

*Primary Examiner* — Tan H Tran

(57) ABSTRACT

A method for implementing visualization of public welfare activities includes: displaying to a target user a map of a geographic region for carrying out a public welfare activity in response to the target user's selection, wherein the map comprises a first geographic location associated with a first icon indicating that the public welfare activity has been carried out at the first geographic location and a second geographic location associated with a second icon indicating that the public welfare activity is able to be carried out at the second geographic location; when a relationship exists between the target user and a public welfare activity participant user that has carried out the public welfare activity on the map, displaying on the map user information of the
(Continued)

public welfare activity participant user; updating the second icon to be a first icon in response to the target user's selection on the second icon.

20 Claims, 5 Drawing Sheets

Related U.S. Application Data continuation of application No. PCT/CN2018/123795, filed on Dec. 26, 2018.

(56) References Cited

U.S. PATENT DOCUMENTS

| | | |
|---|---|---|
| 9,697,485 B2 | 7/2017 | Mason et al. |
| 10,305,850 B1* | 5/2019 | Aziz ................. G06Q 50/01 |
| 2008/0109761 A1 | 5/2008 | Stambaugh |
| 2008/0285527 A1 | 11/2008 | Sammarco |
| 2009/0300528 A1* | 12/2009 | Stambaugh ......... G06F 3/04817 |
| | | 715/764 |
| 2012/0323911 A1* | 12/2012 | Anton ................ G06Q 50/02 |
| | | 707/736 |
| 2013/0159825 A1 | 6/2013 | Nishio et al. |
| 2013/0185368 A1 | 7/2013 | Nordstrom et al. |
| 2013/0218797 A1 | 8/2013 | Prichard et al. |
| 2013/0325966 A1 | 12/2013 | Tseng |
| 2014/0066106 A1 | 3/2014 | Ngo et al. |
| 2014/0195625 A1 | 7/2014 | Weldon |
| 2014/0244320 A1 | 8/2014 | Matsui et al. |
| 2014/0324442 A1 | 10/2014 | Barnes, III |
| 2014/0372434 A1 | 12/2014 | Smith et al. |
| 2015/0106136 A1 | 4/2015 | Halavais et al. |
| 2015/0117631 A1 | 4/2015 | Tuchman et al. |
| 2015/0134603 A1* | 5/2015 | Melamed ............. G06Q 50/01 |
| | | 707/692 |
| 2015/0261844 A1 | 9/2015 | Ramalho |
| 2015/0326624 A1 | 11/2015 | Rajendran et al. |
| 2015/0341747 A1 | 11/2015 | Barrand et al. |
| 2016/0294958 A1 | 10/2016 | Zhang et al. |
| 2016/0343087 A1 | 11/2016 | Dange |
| 2018/0027370 A1 | 1/2018 | Austraat et al. |
| 2020/0112821 A1 | 4/2020 | Phillips et al. |

FOREIGN PATENT DOCUMENTS

| | | | |
|---|---|---|---|
| CN | 104981681 | A | 10/2015 |
| CN | 105051495 | A | 11/2015 |
| CN | 105512733 | A | 4/2016 |
| CN | 105516311 | A | 4/2016 |
| CN | 106457043 | A | 2/2017 |
| CN | 106779117 | A | 5/2017 |
| CN | 106779123 | A | 5/2017 |
| CN | 106815345 | A | 6/2017 |
| CN | 107506376 | A | 12/2017 |
| CN | 108241746 | A | 7/2018 |
| JP | 2003-256684 | A | 9/2003 |
| JP | 2005-339459 | A | 12/2005 |
| JP | 2009-133645 | A | 6/2009 |
| JP | 5668025 | B2 | 2/2015 |
| JP | 3206847 | U | 10/2016 |
| JP | 2017-120487 | A | 7/2017 |
| TW | I232416 | B | 5/2005 |
| TW | 201426328 | A | 7/2014 |
| TW | M539673 | U | 4/2017 |
| WO | 2016/192113 | A1 | 12/2016 |

OTHER PUBLICATIONS

First Search for Chinese Application No. 202010759122.4 dated Jul. 26, 2023.

International Search Report and Written Opinion for Application No. PCT/CN2018/123795, dated Mar. 29, 2019, 15 pages.

Search Report dated Sep. 19, 2019, issued in related Taiwanese Application No. 107143562 (1 page).

First Search dated Jan. 20, 2020, issued in related Chinese Application No. 201810019829.4 (1 page).

First Office Action dated Feb. 3, 2020, issued in related Chinese Application No. 201810019829.4, with English machine translation (14 pages).

Second Office Action dated Apr. 10, 2020, issued in related Chinese Application No. 201810019829.4, with English machine translation (15 pages).

Supplementary Search dated Jun. 22, 2020, issued in related Chinese Application No. 201810019829.4 (1 page).

Gillespie, Assessment and Prediction of Natural Hazards from Satellite Imagery, published 2007, pp. 1-17. (Year: 2007).

Search Report for European Application No. 18899760.5 dated Oct. 7, 2020.

Christa Burns et al., "Google Maps" In: "Google Search Secrets", Oct. 24, 2013.

Written Opinion and Search Report for Singaporean Application No. 11202006130V dated Jul. 6, 2021.

* cited by examiner

METHOD AND APPARATUS FOR VISUALIZATION OF PUBLIC WELFARE ACTIVITIES

CROSS-REFERENCE TO RELATED APPLICATIONS

The application is a continuation application of U.S. application Ser. No. 16/875,850, filed on May 15, 2020, and entitled "METHOD AND APPARATUS FOR VISUALIZATION OF PUBLIC WELFARE ACTIVITIES", which is a continuation application of International Patent Application No. PCT/CN2018/123795, filed on Dec. 26, 2018, and entitled "METHOD AND APPARATUS FOR VISUALIZATION OF PUBLIC WELFARE ACTIVITIES." The PCT application claims priority to and benefits of the Chinese Patent Application No. 201810019829.4, filed on Jan. 9, 2018. All of the above-referenced applications are incorporated herein by reference in their entirety.

TECHNICAL FIELD

The application relates to the field of Internet technologies, and in particular, to a method and apparatus for implementing visualization of public welfare activities.

BACKGROUND

With the rapid development of Internet technologies, more and more public welfare activities have been carried out through the Internet. In addition to carrying out public welfare behavior to help others and the society, online public welfare activities may further help public welfare activity initiators to garner users and increase user traffic.

However, existing technologies enabling users to carry out online public welfare activities provide a relatively poor sense of reality, and users often cannot truly feel that they have participated in public welfare activities. Therefore, it is desirable to provide a more effective solution enabling users to carry out online public welfare activities with a stronger sense of reality.

SUMMARY

The specification provides a method, apparatus, and non-transitory computer-readable storage medium for implementing visualization of public welfare activities.

A method for implementing visualization of public welfare activities is provided, comprising: displaying to a target user multiple geographic regions where a public welfare activity is able to be carried out; in response to a selection operation of the target user on one of the multiple geographic regions, determining the selected geographic region as a target geographic region for carrying out the public welfare activity; displaying to the target user a map of the target geographic region, wherein the map comprises a first geographic location associated with a first icon indicating that the public welfare activity has been carried out at the first geographic location and a second geographic location associated with a second icon indicating that the public welfare activity is able to be carried out at the second geographic location; determining user information of a public welfare activity participant user that has carried out the public welfare activity on the map; determining, based on the user information, whether a relationship exists between the public welfare activity participant user and the target user; in response to determining that a relationship exists between the public welfare activity participant user and the target user, displaying on the map the user information of the public welfare activity participant user and public welfare information of the public welfare activity carried out by the public welfare activity participant user; and in response to a selection operation of the target user on the second icon on the map, updating the selected second icon to be a first icon indicating that the public welfare activity has been carried out at the second geographic location.

In some embodiments, the method further comprises: displaying a session interface oriented to the public welfare activity participant user.

In some embodiments, the session interface is configured to enable the target user to: send an instant session message to the public welfare activity participant user; evaluate the public welfare activity carried out by the public welfare activity participant user; and follow the public welfare activity carried out by the public welfare activity participant user.

In some embodiments, the method further comprises: displaying to the target user a satellite image of the target geographic region.

In some embodiments, the satellite image comprises: a current live satellite image of the target geographic region and a satellite image of the target geographic region before the public welfare activity was carried out.

In some embodiments, the method further comprises: for one of the multiple geographic regions, determining one or more public welfare activity participant users each having a relationship with the target user and having carried out the public welfare activity in the geographic region; summarizing user information of the one or more public welfare activity participant users for the geographic region; and associating the summarized user information with the geographic region for display.

In some embodiments, displaying to a target user multiple geographic regions where a public welfare activity is able to be carried out comprises: displaying to the target user a reduced-size image of the multiple geographic regions where the public welfare activity is able to be carried out.

An apparatus for implementing visualization of public welfare activities is provided, comprising: one or more processors and one or more non-transitory computer-readable memories coupled to the one or more processors and configured with instructions executable by the one or more processors to cause the apparatus to perform operations comprising: displaying to a target user multiple geographic regions where a public welfare activity is able to be carried out; in response to a selection operation of the target user on one of the multiple geographic regions, determining the selected geographic region as a target geographic region for carrying out the public welfare activity; displaying to the target user a map of the target geographic region, wherein the map comprises a first geographic location associated with a first icon indicating that the public welfare activity has been carried out at the first geographic location and a second geographic location associated with a second icon indicating that the public welfare activity is able to be carried out at the second geographic location; determining user information of a public welfare activity participant user that has carried out the public welfare activity on the map; determining, based on the user information, whether a relationship exists between the public welfare activity participant user and the target user; in response to determining that a relationship exists between the public welfare activity participant user and the target user, displaying on the map the user information of the public welfare activity participant user and public welfare information of the public welfare activity carried out by the public welfare activity participant user; and in response to a selection operation of the target user on the second icon on the map, updating the selected second icon to be a first icon indicating that the public welfare activity has been carried out at the second geographic location.

A non-transitory computer-readable storage medium for implementing visualization of public welfare activities is provided. The non-transitory computer-readable storage medium is configured with instructions executable by one or more processors to cause the one or more processors to perform operations comprising: displaying to a target user multiple geographic regions where a public welfare activity is able to be carried out; in response to a selection operation of the target user on one of the multiple geographic regions, determining the selected geographic region as a target geographic region for carrying out the public welfare activity; displaying to the target user a map of the target geographic region, wherein the map comprises a first geographic location associated with a first icon indicating that the public welfare activity has been carried out at the first geographic location and a second geographic location associated with a second icon indicating that the public welfare activity is able to be carried out at the second geographic location; determining user information of a public welfare activity participant user that has carried out the public welfare activity on the map; determining, based on the user information, whether a relationship exists between the public welfare activity participant user and the target user; in response to determining that a relationship exists between the public welfare activity participant user and the target user, displaying on the map the user information of the public welfare activity participant user and public welfare information of the public welfare activity carried out by the public welfare activity participant user; and in response to a selection operation of the target user on the second icon on the map, updating the selected second icon to be a first icon indicating that the public welfare activity has been carried out at the second geographic location.

The specification may display a public welfare map to a user, and the user may select a site for carrying out a public welfare activity through the public welfare map, thereby enhancing the sense of reality for the user participating in online public welfare activities, and improving the user's online public welfare experience.

DETAILED DESCRIPTION

Embodiments are described hereinafter in detail, examples of which are illustrated in the accompanying drawings. When the following description refers to the accompanying drawings, same numbers in different accompanying drawings indicate same or similar elements unless otherwise indicated. Embodiments described below do not represent all embodiments consistent with the specification. They are merely examples of apparatus and methods consistent with some aspects of the specification that are described in the appended claims in detail.

Terms used in the specification are for the purpose of describing embodiments and are not intended to limit the specification. As used in the specification and the appended claims, singular forms "a," "the," and "said" are intended to include plural forms as well, unless the context clearly indicates otherwise. In addition, the term "and/or" used in the specification refers to and includes any or all possible combinations of one or more listed associated items.

Although terms such as first, second, third, and the like may be used in the specification to describe various information, the information should not be limited to these terms. These terms are used to distinguish a same type of information from each other. For example, without departing from the scope of the specification, first information may also be referred to as second information; and similarly, second information may also be referred to as first information. Depending on the context, the word "if" as used herein may be interpreted as "at the time when," "when," or "in response to determination."

The specification provides embodiments for implementing visualization of public welfare activities. A user may select a site for the public welfare activity through a public welfare map, thus the sense of reality is enhanced for the user participating in online public welfare activities, and the user's online public welfare experience is improved.

Figure 1:
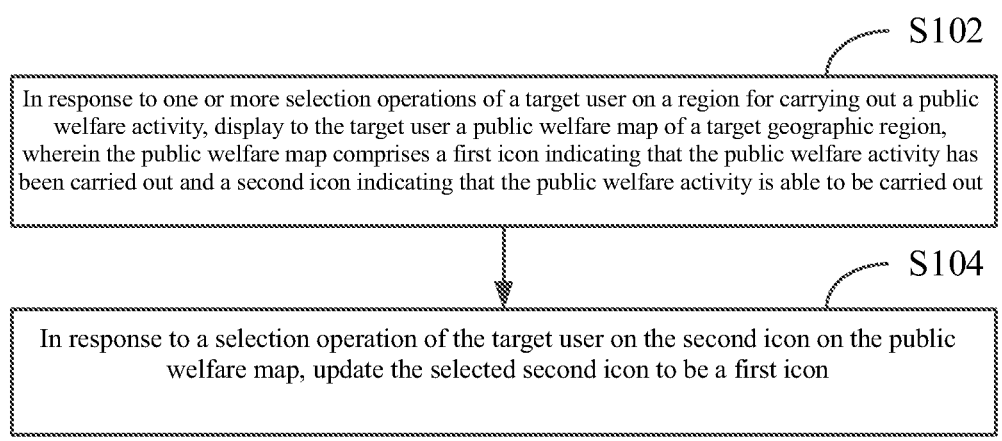
FIG. 1 is a schematic flow chart of a method for implementing visualization of public welfare activities according to some embodiments of the specification.

FIG. 1 is a schematic flow chart of a method for implementing visualization of public welfare activities according to some embodiments of the specification.

The method for implementing visualization of public welfare activities is applicable to a terminal device, for example, an intelligent device with a display screen, such as a mobile phone, a tablet computer, or a PC. The method for implementing visualization of public welfare activities may also be applicable to a server, which may communicate with a terminal device with a display screen, and further send a related instruction to the terminal device, such that the terminal device performs display accordingly through the display screen. However, the specification is not limited thereto.

Referring to FIG. 1, the method for implementing visualization of public welfare activities may include the following steps:

Step 102, in response to one or more selection operations of a target user on a region for carrying out a public welfare activity, displaying to the target user a public welfare map of a target geographic region, wherein the public welfare map includes a first icon indicating that the public welfare activity has been carried out and a second icon indicating that the public welfare activity is able to be carried out.

In some embodiments, the target user may be enabled by a user interface to select a region for carrying out a public welfare activity. The user interface may then display a map or image of the region, enabling the target user to further select a target geographic region. The target geographic region may be one of the portions of the bigger region. In some embodiments, the target geographic region may be set by the target user. A map of the target geographic region for carrying out the public welfare activity (also referred to as a public welfare map) may be displayed to the target user.

The first icon is different from the second icon. For example, the first icon and the second icon may be two different types of icons. The first icon may indicate a geographic location at which at least one public welfare activity has been carried out. In some embodiments, no more public welfare activity can be carried out at the geographic location labeled with the first icon. The second icon may indicate a geographic location at which a public welfare activity is able to be carried out. In other words, no public welfare activity has been carried out at the geographic location corresponding to the second icon. In other embodiments, the meaning represented by the first icon and the meaning represented by the second icon may be interchangeable or different from the above-described two meanings. The specification is not limited thereto.

The above-described geographic location may represent a geographic location in the real world, such as a location corresponding to a pair of longitude and latitude coordinates. In some embodiments, the above-described geographic location may represent a geographic location region in the real world, such as a rectangular or a circular location region, or a location region in another shape. For example, the first and the second icon may be used to label a geographic location or a geographic location region wherein a public welfare activity has been or has not been carried out on the public welfare map.

Step 104, in response to a selection operation of the target user on the second icon on the public welfare map, updating the selected second icon to be a first icon.

In some embodiments, the target user may select a second icon on the public welfare map to indicate that the target user intends a public welfare activity to be carried out at the geographic location or geographic location region associated with the second icon. When the second icon is selected by the target user, the second icon may be updated to be a first icon, thus prompting the target user that a site selection is successful.

Based on the second icon selected by the target user, a public welfare activity provider may carry out a corresponding public welfare activity at a geographic location or in a geographic location region that corresponds to the second icon.

In the specification, a public welfare map may be displayed to a user, and the user may select a site for a public welfare activity through the public welfare map, thereby enhancing the sense of reality for the user participating in the online public welfare activity, and improving the user's online public welfare experience.

Tree planting is taken as an example of public welfare activity below to describe the technical solutions provided in the specification in detail from the two aspects of selecting a target geographic region and selecting a tree-planting region.

1. Selecting a Target Geographic Region

In some embodiments, for ease of distinction, a user who intends to select a site for a tree-planting public welfare activity to be carried out may be referred to as a target user, and a user who has selected a site for a tree-planting public welfare activity to be carried out may be referred to as a public welfare activity participant user.

The target user may initiate a tree-planting region selection operation by using related client software loaded in a terminal device. For example, the target user may initiate the tree-planting region selection operation and the like by clicking a "select a site" button and the like.

After the above-described tree-planting region selection operation is received, an image of multiple geographic regions in which a tree planting activity is able to be carried out is displayed to the target user on a display screen. In some embodiments, the image of the multiple geographic regions may be a reduced-size image containing the multiple geographic regions. For example, the image of the multiple geographic regions may be a thumbnail image showing the multiple geographic regions. A provider for the tree-planting public welfare activity may preset a dividing rule for dividing the geographic regions. For example, the provider may divide a region in which a tree-planting behavior is able to be carried out into a number of geographic regions.

Figure 2:
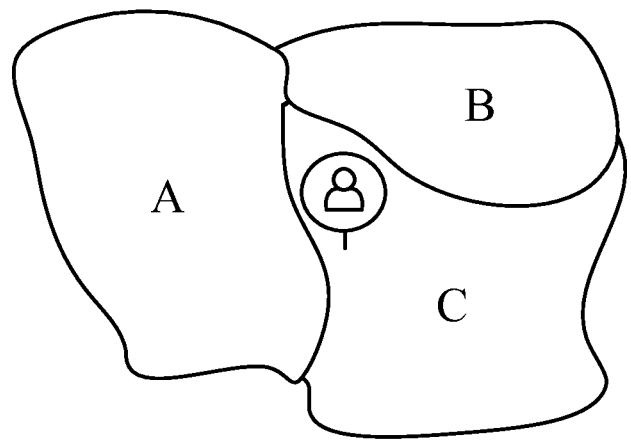
FIG. 2 is a schematic diagram of a display page for an image of geographic regions according to some embodiments of the specification.

Referring to an image of geographic regions shown in FIG. 2, the image includes three geographic regions, which are respectively a geographic region A, a geographic region B, and a geographic region C. The target user may select one of the geographic regions by moving a user icon in the image to the geographic region to be selected.

Assuming that the target user moves the user icon to the geographic region A, and clicks a confirmation button (not shown in the figure), e.g., an "OK" button, the geographic region A is then determined to be the target geographic region.

In another example, when an image of geographic regions is displayed, for each geographic region, a number of public welfare activity participant users may be further determined, each of whom has a designated user relationship with the target user, and has carried out a public welfare activity in the geographic region; and user information of the number of public welfare activity participant users is summarized; and the summarized user information is associated with the geographic region in the image for display.

Taking the geographic region A as an example, user information of public welfare activity participant users who have carried out at least a tree-planting behavior in the geographic region A may be first obtained. Then it may be determined based on the user information whether the public welfare activity participant users have a designated user relationship with the target user, such as a friendship, a follower-following relationship, or a fund-transactional relationship. Then a number of public welfare activity participant users each having a designated user relationship with the target user may be counted, and the number may be associated with the geographic region A for display, such that the target user learns the tree-planting site selection status of the users who have a designated user relationship with the target user.

A friendship is taken as an example of the designated user relationship below. Assuming that 25 public welfare activity participant users who have participated in public welfare activities in the geographic region A have a friendship with the target user, 5 public welfare activity participant users who have participated in public welfare activities in the geographic region B have a friendship with the target user, and 8 public welfare activity participant users who have participated in public welfare activities in the geographic region C have a friendship with the target user, an image, as shown in FIG. 3, may then be displayed to the target user.

Figure 3:
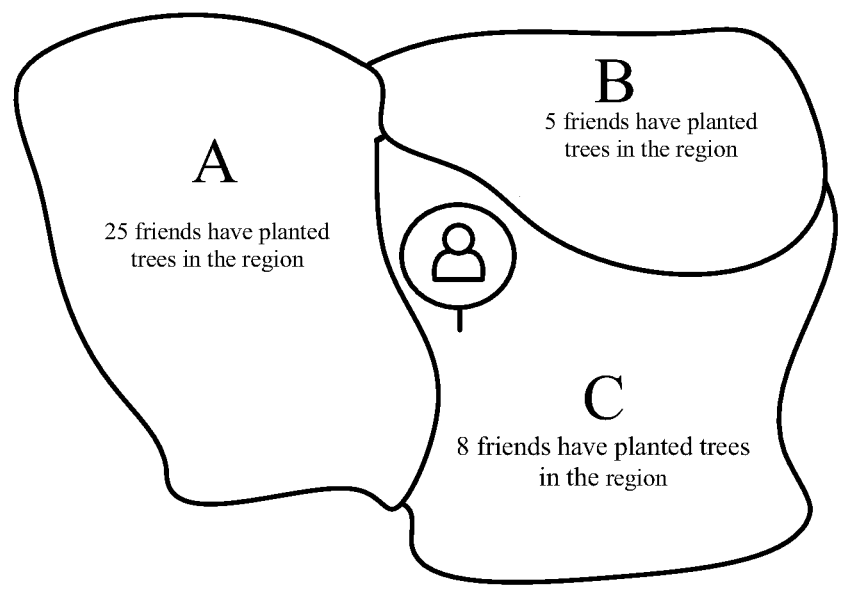
FIG. 3 is a schematic diagram of a display page for another image of geographic regions according to some embodiments of the specification.

Based on the image shown in FIG. 3, the target user may visually learn the tree-planting site selection status of friends, and may select the geographic region associated with relatively more friends or the geographic region associated with relatively fewer friends as the target geographic region.

In some embodiments, in addition to the number of public welfare activity participant users who have a designated user relationship with the target user, the user information associated with the image of the geographic regions for display may further include other user information, such as profile pictures of the public welfare activity participant users. The specification is not limited thereto.

In the specification, the user information of the public welfare activity participant users who have a designated user relationship with the target user is associated with the image of the geographic regions for display, thereby enhancing the interaction of the target user with other users during the site-selection process of the online public welfare behavior, and improving the target user's site selection experience.

In another example, a target user may also select a target geographic region by using a list of geographic regions and the like. If there is one geographic region, the target user may not be required to make a selection. The provider of the tree-planting public welfare activity may configure the selection of geographic region. The specification is not limited thereto.

2. Selecting a Tree-Planting Region

In some embodiments, after the target geographic region is determined, a public welfare map of the target geographic region may be displayed to the target user. For example, the display of the public welfare map may be implemented by enlarging the target geographic region, page-redirecting, or the like. The specification is not limited thereto.

A location at which the tree-planting activity has been carried out and a location at which the tree-planting activity is able to be carried out may be marked on the public welfare map by using different types of icons. For a more authentic experience, each type of icon may correspond to one of physical tree-planting locations.

Figure 4:
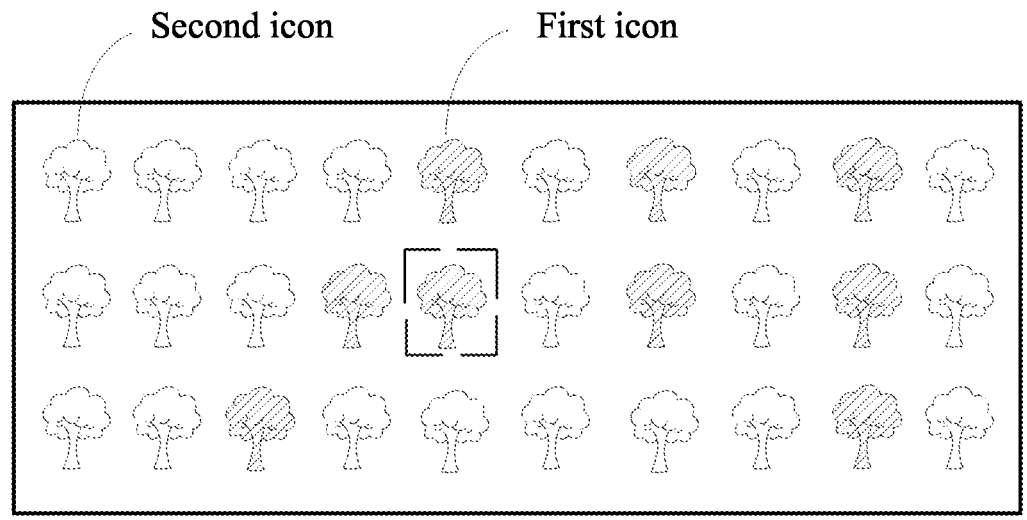
FIG. 4 is a schematic diagram of a display page for a public welfare map according to some embodiments of the specification.

For example, referring to FIG. 4, a shaded icon in FIG. 4 may be referred to as a first icon, which is used to indicate that a tree has been planted at a location corresponding to the first icon; an unshaded icon in FIG. 4 may be referred to as a second icon, which is used to indicate that a tree is able to be planted at a location corresponding to the second icon. The first icon circled by a cursor in FIG. 4 represents a tree-planting location selected by default for the target user by a system.

The target user may select a tree-planting location by moving the cursor. For example, the target user may move the cursor to a second icon by sliding (a finger) on a display screen, clicking direction buttons (not shown in the figure), or the like.

After selecting the second icon for tree planting, the target user may input a selection operation by using an "OK" button (not shown in the figure). After the selection operation is received, the second icon selected by the target user may be updated to be a first icon, so as to prompt the target user that a tree-planting site selection is successful.

In some embodiments, before the icon update, a confirmation prompt box may be outputted to the target user, such that the target user may confirm the selected location and some related information, such as an environmental protection manifesto. The specification is not limited thereto.

In another example, similar to the display of the geographic region, user information of multiple public welfare activity participant users who have carried out public welfare activities on the public welfare map may be further determined; then a number of public welfare activity participant users each of whom has a designated user relationship with the target user is determined; and then the user information of a public welfare activity participant user and public welfare information of the public welfare activity carried out by the public welfare activity participant user are displayed at a first icon, which corresponds to a location at which the public welfare activity participant user who has planted a tree.

The user information may include a user profile picture, a user nickname, and the like. The public welfare information may include a tree-planting manifesto, longitude and latitude coordinates of the tree-planting location, and the like.

Figure 5:
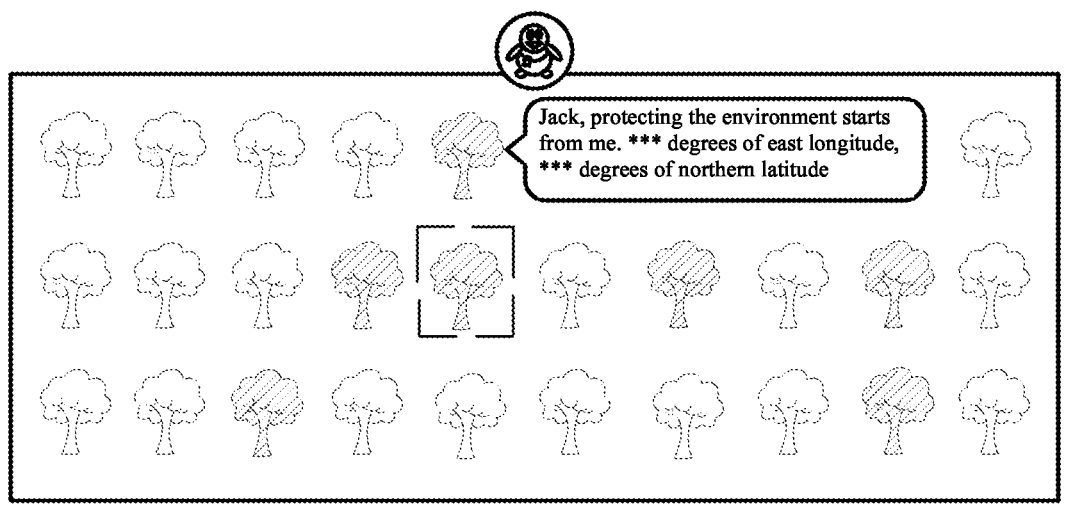
FIG. 5 is a schematic diagram of a display page for another public welfare map according to some embodiments of the specification.

Referring to FIG. 5, assuming that a system selects a tree-planting location by default for the target user and a planter of a tree in the north of the tree-planting location is the target user's friend called Jack, then a profile picture of Jack, a tree-planting manifesto, and longitude and latitude coordinates of the tree-planting location may be displayed in association with the first icon indicating Jack's tree planting.

Based on the public welfare map shown in FIG. 5, the target user may visually learn friends' tree-planting locations, such that the target user may choose to plant a tree near or away from the friends' trees.

In some embodiments, for a public welfare activity participant user who does not have a designated user relationship with the target user, user information of the public welfare activity participant user and public welfare information may also be displayed on the public welfare map. To avoid the interference caused by displaying excessive information to the target user's site selection, user information and public welfare information for a public welfare activity participant user who does not have a designated user relationship with the target user may be hidden by default. When the target user clicks a first icon, the user information and the public welfare information of the public welfare activity participant user corresponding to the first icon are then displayed. The specification is not limited thereto.

In another example, when the target user selects, from the displayed content, a public welfare activity participant user or the above-described information related to the public welfare activity participant user, a session interface oriented to the public welfare activity participant user may be displayed.

The session interface may include an instant communication session box, through which the target user may send instant session information to the public welfare activity participant user.

The session interface may further include a comment session box regarding the tree-planting behavior of the public welfare activity participant user, through which the target user may comment on the tree-planting behavior of the public welfare activity participant user.

The session interface may further include a button for performing a following operation on the tree-planting behavior of the public welfare activity participant user, such as a Like button, a Follow button, or a Set-to-Top button. The specification is not limited thereto.

In the embodiments, the user may select, on a public welfare map, a tree-planting site that corresponds to a real tree-planting scene, thereby greatly enhancing the sense of reality for the user participating the online tree-planting activity, and improving the user's online public welfare experience.

In some embodiments, the tree-planting public welfare behavior is still taken as an example, and the target user may view a live satellite image of a tree-planting region by using related client software.

For example, the target user may send an instruction for live view by clicking a "live scene" button or the like; and a current live satellite image of the target geographic region may be displayed to the target user based on the instruction, so that the target user may view the real condition of the target geographic region.

In other examples, to enable the target user to visually learn the change that tree planting may bring to the target geographic region, in addition to displaying the current live satellite image, a satellite image of the target geographic region before the tree-planting activity was carried out may further be displayed to the target user. By displaying the two satellite images in comparison, the specification enables the target user to visually learn the change that the target user's public welfare behavior may bring to the target geographic region, thereby strengthening the target user's interest in public welfare.

In accordance with the method embodiments for implementing visualization of public welfare activities, the specification further provides apparatus embodiments for implementing visualization of public welfare activities.

Figure 6:
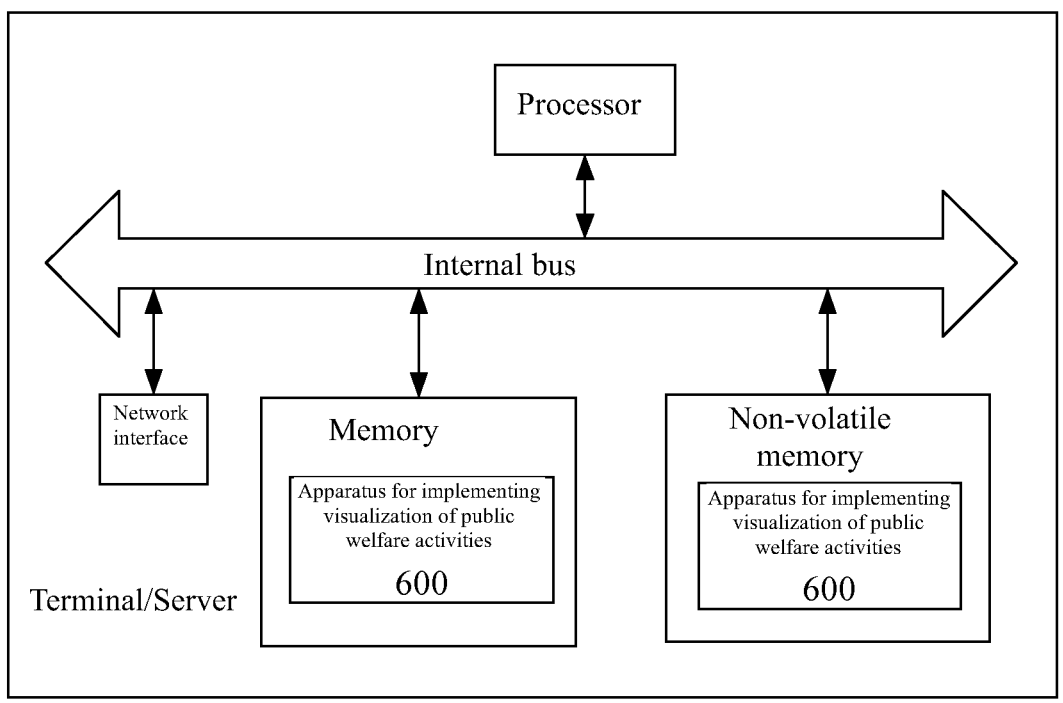
FIG. 6 is a schematic structural diagram of an apparatus for implementing visualization of public welfare activities according to some embodiments of the specification.

An apparatus embodiment for implementing visualization of public welfare activities in the specification may be applicable to a terminal device or a server. The apparatus embodiment may be implemented by software, by hardware, or through a combination of software and hardware. Taking software implementation as an example, an apparatus in the sense of logics is formed by a processor of a terminal device or server at which the apparatus is located reading corresponding computer program instructions in a non-volatile memory into a memory and running the computer program instructions. In terms of hardware, FIG. 6 is a diagram of a hardware structure of a terminal device or server at which the apparatus for implementing visualization of public welfare activities in the specification is located. In addition to a processor, a memory, a network interface, and a non-volatile memory shown in FIG. 6, the terminal device or server at which the apparatus is located in some embodiments may further include other hardware according to functions of the terminal device or server, which are not described in detail herein.

Figure 7:
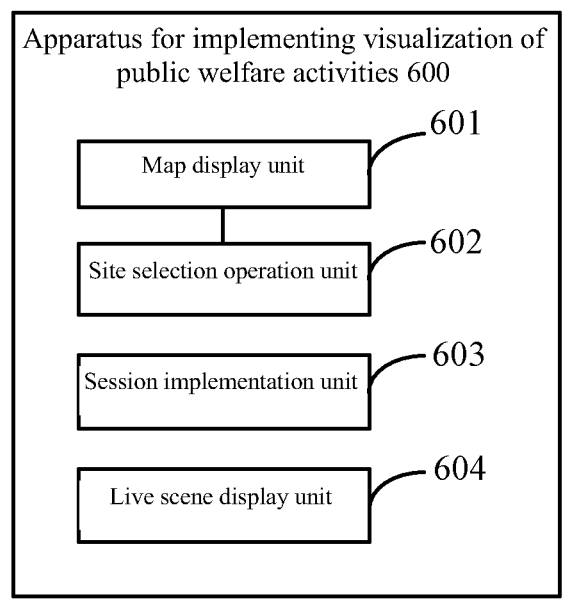
FIG. 7 is a block diagram of an apparatus for implementing visualization of public welfare activities according to some embodiments of the specification.

FIG. 7 is a block diagram of an apparatus for implementing visualization of public welfare activities according to some embodiments of the specification.

Referring to FIG. 7, the apparatus 600 for implementing visualization of public welfare activities is applicable to the terminal device or server shown in FIG. 6, and includes a map display unit 601, a site selection operation unit 602, a session implementation unit 603, and a live scene display unit 604.

The map display unit 601 is configured to, in response to a selection operation of a target user regarding a region for carrying out a public welfare activity, display to the target user a public welfare map of a target geographic region, wherein the public welfare map includes a first icon indicating that the public welfare activity has been carried out and a second icon indicating that the public welfare activity is able to be carried out;

the site selection operation unit 602 is configured to, in response to a selection operation of the target user regarding the second icon on the public welfare map, update the selected second icon to be a first icon.

In some embodiments, the map display unit 601 is further configured to: determine user information of a public welfare activity participant user that has carried out the public welfare activity on the public welfare map; determine, based on the user information, whether the public welfare activity participant user has a designated user relationship with the target user; and if the public welfare activity participant user has the designated user relationship with the target user, display on the public welfare map the user information of the public welfare activity participant user and public welfare information of the public welfare activity carried out by the public welfare activity participant user.

The session implementation unit 603 is configured to: in response to a selection operation of the target user regarding the public welfare activity participant user on the public welfare map, display a session interface oriented to the public welfare activity participant user.

In some embodiments, the session interface may include one or a plurality of functions as follows:

sending an instant session message to the public welfare activity participant user; evaluating the public welfare activity carried out by the public welfare activity participant user; and following the public welfare activity carried out by the public welfare activity participant user.

The live scene display unit 604 is configured to, in response to a live viewing operation of the target user, display to the target user a satellite image of the target geographic region.

In some embodiments, the satellite image may include: a current live satellite image and a satellite image of the target geographic region before the public welfare activity was carried out.

In some embodiments, before displaying to the target user a public welfare map of a target geographic region, the map display unit 601 is further configured to: in response to the selection operation of the target user regarding the region for carrying out the public welfare activity, display to the target user an image of multiple geographic regions in which the public welfare activity is able to be carried out; and in response to a selection operation of the target user on one of the multiple geographic regions in the image, determine the selected geographic region in the image as a target geographic region, and perform an operation of displaying to the target user a public welfare map of the target geographic region.

In some embodiments, the map display unit 601 is further configured to: for each geographic region, determine public welfare activity participant users each having a designated user relationship with the target user and having carried out the public welfare activity in the geographic region; summarize user information of the public welfare activity participant users; and associate the summarized user information with the geographic region in the image for display.

For details about the implementation process of the functions and roles of the units in the above-described apparatus, refer to the implementation process of the corresponding steps in the above-described method. Details are not described herein again.

The apparatus embodiments are basically corresponding to the method embodiments. Therefore, for relevant content, reference may be made to some of the description in the method embodiments. The apparatus embodiments described above are merely examples. The units described as separate components may or may not be physically separated, and the components shown as units may or may not be physical units, i.e., may be located in one place or distributed across a plurality of network units. Some or all of the modules thereof can be selected according to actual needs to achieve the objective of the solutions in the specification. Those skilled in the art can understand and implement the specification without creative efforts.

Systems, apparatuses, modules, or units illustrated in the above-described embodiments may be implemented by computer chips or entities, or by products with some functions. A typical implementation device is a computer. For example, the computer may be a personal computer, a laptop computer, a cellular phone, a camera phone, a smart phone, a personal digital assistant, a media player, a navigation device, an e-mail transceiver device, a game console, a tablet computer, a wearable device, or a combination of any of these devices.

In accordance with the foregoing method embodiments for implementing visualization of public welfare activities, the specification further provides another apparatus for implementing visualization of public welfare activities. The apparatus for implementing visualization of public welfare activities includes a processor and a memory configured to store machine-executable instructions. The processor and the memory are usually interconnected by using an internal bus. In other embodiments, the device may further include an external interface to communicate with other devices or components.

In some embodiments, by reading and executing the machine-executable instructions stored in the memory and corresponding to logic for implementing visualization of public welfare activities, the processor is caused to: in response to a selection operation of a target user regarding a region for carrying out a public welfare activity, display to the target user a public welfare map of a target geographic region, wherein the public welfare map includes a first icon indicating that the public welfare activity has been carried out and a second icon indicating that the public welfare activity is able to be carried out; and in response to a selection operation of the target user regarding the second icon on the public welfare map, update the selected second icon to be a first icon.

In some embodiments, by reading and executing the machine-executable instructions stored in the memory and corresponding to logic for implementing visualization of public welfare activities, the processor is further caused to: determine user information of a public welfare activity participant user that has carried out the public welfare activity on the public welfare map; determine, based on the user information, whether the public welfare activity participant user has a designated user relationship with the target user; and if the public welfare activity participant user has the designated user relationship with the target user, display on the public welfare map the user information of the public welfare activity participant user and public welfare information of the public welfare activity carried out by the public welfare activity participant user.

In some embodiments, by reading and executing the machine-executable instructions stored in the memory and corresponding to logic for implementing visualization of public welfare activities, the processor is further caused to: in response to a selection operation of the target user regarding the public welfare activity participant user on the public welfare map, display a session interface oriented to the user who participated in public welfare activities.

In some embodiments, the session interface may enable the target user to perform the following operations: sending an instant session message to the public welfare activity participant user; evaluating the public welfare activity carried out by the public welfare activity participant user; and following the public welfare activity carried out by the public welfare activity participant user.

In some embodiments, by reading and executing the machine-executable instructions stored in the memory and corresponding to logic for implementing visualization of public welfare activities, the processor is further caused to: in response to a live viewing operation of the target user, display to the target user a satellite image of the target geographic region.

In some embodiments, the satellite image may include: a current live satellite image and a satellite image of the target geographic region before the public welfare activity was carried out.

In some embodiments, by reading and executing the machine-executable instructions stored in the memory and corresponding to logic for implementing visualization of public welfare activities, the processor is further caused to: before displaying to the target user a public welfare map of a target geographic region, in response to the selection operation of the target user regarding the region for carrying out the public welfare activity, display to the target user an image of multiple geographic regions in which the public welfare activity is able to be carried out; and in response to a selection operation of the target user on one of the multiple geographic regions in the image, determine the selected geographic region in the image as the target geographic region, and perform an operation of displaying to the target user a public welfare map of the target geographic region.

In some embodiments, by reading and executing the machine-executable instructions stored in the memory and corresponding to logic for implementing visualization of public welfare activities, the processor is further caused to: for each geographic region, determine public welfare activity participant users each having a designated user relationship with the target user, and having carried out the public welfare activity in the geographic region; summarize user information of the public welfare activity participant user; and associate the summarized user information with the image of the geographic regions for display.

In accordance with the aforementioned method embodiments for implementing visualization of public welfare activities, the specification further provides a computer-readable storage medium having stored thereon computer programs which, when executed by a processor, implement the following steps: in response to a selection operation of a target user regarding a region for carrying out a public welfare activity, displaying to the target user a public welfare map of a target geographic region, wherein the public welfare map includes a first icon indicating that the public welfare activity has been carried out and a second icon indicating that the public welfare activity is able to be carried out; and in response to a selection operation of the target user regarding the second icon on the public welfare map, updating the selected second icon to be a first icon.

In some embodiments, the steps further include: determining user information of a public welfare activity participant user that has carried out the public welfare activity on the public welfare map; determining, based on the user information, whether the public welfare activity participant user has a designated user relationship with the target user; and if the public welfare activity participant user has the designated user relationship with the target user, displaying on the public welfare map the user information of the public welfare activity participant user and public welfare information of the public welfare activity carried out by the public welfare activity participant user.

In some embodiments, the steps further include: in response to a selection operation of the target user regarding the public welfare activity participant user on the public welfare map, displaying a session interface oriented to the public welfare activity participant user.

In some embodiments, the session interface may enable the target user to perform the following operations: sending an instant session message to the public welfare activity participant user; evaluating the public welfare activity carried out by the public welfare activity participant user; and following the public welfare activity carried out by the public welfare activity participant user.

In some embodiments, the steps further include: in response to a live viewing operation of the target user, displaying to the target user a satellite image of the target geographic region.

In some embodiments, the satellite image may include: a current live satellite image and a satellite image of the target geographic region before the public welfare activity was carried out.

In some embodiments, before displaying to the target user a public welfare map of a target geographic region, the steps further include: in response to the selection operation of the target user regarding the region for carrying out the public welfare activity, displaying to the target user an image of multiple geographic regions in which the public welfare activity is able to be carried out; and in response to a selection operation of the target user on the image, determining a selected geographic region corresponding to the image as a target geographic region, and performing an operation of displaying to the target user a public welfare map of the target geographic region.

In some embodiments, the steps further include: for each geographic region, determining public welfare activity participant users each having a designated user relationship with the target user, and having carried out the public welfare activity in the geographic region; summarizing user information of the public welfare activity participant users for the geographic region; and associating the summarized user information with the geographic region in the image for display.

Some embodiments of the specification are described above. There are other embodiments that fall within the scope of the appended claims. In some embodiments, actions or steps recorded in the claims may be performed in a sequence different from that in the embodiments and a desired result can still be achieved. In addition, the desired result can still be achieved if the processes described in the drawings are not necessarily performed in the illustrated or continuous sequence. In some embodiments, multitasking and parallel processing are also feasible or may be advantageous.

The above-described embodiments are some embodiments of the specification and are not intended to limit the specification. Any modifications, equivalent replacements, improvements, or the like made within the spirit and principles of the specification shall fall within the protection scope of the specification.

The invention claimed is:

1. A method for implementing visualization of public welfare activities, implementable by a computer, comprising:

displaying to a target user a first map of multiple geographic regions for carrying out a public welfare activity;

determining user information of public welfare activity participant users that have carried out the public welfare activity on the first map;

determining, based on the user information of the public welfare activity participant users, whether a relationship exists between each of the public welfare activity participant users and the target user;

displaying to the target user, in each of the geographic regions in the first map, profile pictures of the public welfare activity participant users that have carried out the public welfare activity in the geographic region, wherein the displaying comprises:

displaying the profile pictures of the public welfare activity participant users who have a relationship with the target user;

hiding, by default, the profile pictures of the public welfare activity participant users who has no relationship with the target user; and displaying, in response to a triggering event from the target user, the profile pictures of the public welfare activity participant users who has no relationship with the target user;

in response to a selection operation of the target user on one of the multiple geographic regions in the first map, determining the selected geographic region as a target geographic region for carrying out the public welfare activity by the target user;

displaying to the target user a second map of the target geographic region, wherein the second map comprises one or more first geographic locations associated with a first icon indicating that the public welfare activity has been carried out at the one or more first geographic locations and one or more second geographic locations associated with a second icon indicating that the public welfare activity has not been carried out at the one or more second geographic locations; and in response to a selection operation of the target user on the second icon on the second map associated with one of the one or more second geographic locations, updating the selected second icon to be the first icon indicating that the public welfare activity has been carried out at the one of the one or more second geographic locations.

2. The method according to claim 1, further comprising: displaying to the target user, in each of the geographic regions in the first map, a number of the public welfare activity participant users that have carried out the public welfare activity in the geographic region and have a relationship with the target user.

3. The method according to claim 1, further comprising: displaying a session interface oriented to one of the public welfare activity participant users.

4. The method according to claim 3, wherein the session interface is configured to enable the target user to:

send an instant session message to one of the public welfare activity participant users;

evaluate the public welfare activity carried out by the one of the public welfare activity participant users; and follow the public welfare activity carried out by the one of the public welfare activity participant users.

5. The method according to claim 1, further comprising: displaying to the target user a satellite image of the target geographic region.

6. The method according to claim 5, wherein the satellite image comprises:
   a current live satellite image of the target geographic region and a satellite image of the target geographic region before the public welfare activity was carried out.

7. The method according to claim 1, further comprising:
   in response to a user operation of pointing to one of the one or more first geographic locations, automatically displaying user information of one of the public welfare activity participant users associated with the one of the one or more first geographic locations.

8. An apparatus for implementing visualization of public welfare activities, comprising: one or more processors and one or more non-transitory computer-readable memories coupled to the one or more processors and configured with instructions executable by the one or more processors to cause the apparatus to perform operations comprising:
   displaying to a target user a first map of multiple geographic regions for carrying out a public welfare activity;
   determining user information of public welfare activity participant users that have carried out the public welfare activity on the first map;
   determining, based on the user information of the public welfare activity participant users, whether a relationship exists between each of the public welfare activity participant users and the target user;
   displaying to the target user, in each of the geographic regions in the first map, profile pictures of the public welfare activity participant users that have carried out the public welfare activity in the geographic region, wherein the displaying comprises:
      displaying the profile pictures of the public welfare activity participant users who have a relationship with the target user;
      hiding, by default, the profile pictures of the public welfare activity participant users who has no relationship with the target user; and
      displaying, in response to a triggering event from the target user, the profile pictures of the public welfare activity participant users who has no relationship with the target user;
   in response to a selection operation of the target user on one of the multiple geographic regions in the first map, determining the selected geographic region as a target geographic region for carrying out the public welfare activity by the target user;
   displaying to the target user a second map of the target geographic region, wherein the second map comprises one or more first geographic locations associated with a first icon indicating that the public welfare activity has been carried out at the one or more first geographic locations and one or more second geographic locations associated with a second icon indicating that the public welfare activity has not been carried out at the one or more second geographic locations; and
   in response to a selection operation of the target user on the second icon on the second map associated with one of the one or more second geographic locations, updating the selected second icon to be the first icon indicating that the public welfare activity has been carried out at the one of the one or more second geographic locations.

9. The apparatus according to claim 8, wherein the operations further comprise:
   displaying to the target user, in each of the geographic regions in the first map, a number of the public welfare activity participant users that have carried out the public welfare activity in the geographic region and have a relationship with the target user.

10. The apparatus according to claim 8, wherein the operations further comprise:
    displaying a session interface oriented to one of the public welfare activity participant users.

11. The apparatus according to claim 10, wherein the session interface is configured to enable the target user to:
    send an instant session message to the one of the public welfare activity participant users; evaluate the public welfare activity carried out by the one of the public welfare activity participant users; and follow the public welfare activity carried out by the one of the public welfare activity participant users.

12. The apparatus according to claim 8, wherein the operations further comprise:
    displaying to the target user a satellite image of the target geographic region.

13. The apparatus according to claim 12, wherein the satellite image comprises: a current live satellite image of the target geographic region and a satellite image of the target geographic region before the public welfare activity was carried out.

14. The apparatus according to claim 8, wherein the operations further comprise:
    in response to a user operation of pointing to one of the one or more first geographic locations, automatically displaying user information of one of the public welfare activity participant users associated with the one of the one or more first geographic locations.

15. A non-transitory computer-readable storage medium configured with instructions executable by one or more processors to cause the one or more processors to perform operations comprising:
    displaying to a target user a first map of multiple geographic regions for carrying out a public welfare activity;
    determining user information of public welfare activity participant users that have carried out the public welfare activity on the first map;
    determining, based on the user information of the public welfare activity participant users, whether a relationship exists between each of the public welfare activity participant users and the target user;
    displaying to the target user, in each of the geographic regions in the first map, profile pictures of the public welfare activity participant users that have carried out the public welfare activity in the geographic region, wherein the displaying comprises:
       displaying the profile pictures of the public welfare activity participant users who have a relationship with the target user;
       hiding, by default, the profile pictures of the public welfare activity participant users who has no relationship with the target user; and
       displaying, in response to a triggering event from the target user, the profile pictures of the public welfare activity participant users who has no relationship with the target user;
    in response to a selection operation of the target user on one of the multiple geographic regions in the first map, determining the selected geographic region as a target geographic region for carrying out the public welfare activity by the target user;

displaying to the target user a second map of the target geographic region, wherein the second map comprises one or more first geographic locations associated with a first icon indicating that the public welfare activity has been carried out at the one or more first geographic locations and one or more second geographic locations associated with a second icon indicating that the public welfare activity has not been carried out at the one or more second geographic locations; and in response to a selection operation of the target user on the second icon on the second map associated with one of the one or more second geographic locations, updating the selected second icon to be the first icon indicating that the public welfare activity has been carried out at the one of the one or more second geographic locations.

16. The non-transitory computer-readable storage medium according to claim 15, wherein the operations further comprise:

displaying to the target user, in each of the geographic regions in the first map, a number of the public welfare activity participant users that have carried out the public welfare activity in the geographic region and have a relationship with the target user.

17. The non-transitory computer-readable storage medium according to claim 15, wherein the operations further comprise:

displaying a session interface oriented to one of the public welfare activity participant users.

18. The non-transitory computer-readable storage medium according to claim 17, wherein the session interface is configured to enable the target user to:

send an instant session message to the one of the public welfare activity participant users; evaluate the public welfare activity carried out by the one of the public welfare activity participant users; and follow the public welfare activity carried out by the one of the public welfare activity participant users.

19. The non-transitory computer-readable storage medium according to claim 15, wherein the operations further comprise:

displaying to the target user a satellite image of the target geographic region, wherein the satellite image comprises: a current live satellite image of the target geographic region and a satellite image of the target geographic region before the public welfare activity was carried out.

20. The non-transitory computer-readable storage medium according to claim 15, wherein the operations further comprise:

in response to a user operation of pointing to one of the one or more first geographic locations, automatically displaying user information of one of the public welfare activity participant users associated with the one of the one or more first geographic locations.

* * * * *